3,111,502
STABILIZED OLEFIN POLYMER COMPOSITIONS
Aubert Y. Coran, Brentwood, Mo., assignor to Monsanto Chemical Company, St. Louis, Mo., a corporation of Delaware
No Drawing. Filed Dec. 30, 1957, Ser. No. 705,818
12 Claims. (Cl. 260—45.8)

This invention relates to new and improved olefin polymer compositions. While the invention relates particularly to polyethylene compositions, it also relates to other olefin polymer compositions, which are hereinafter described in greater detail.

It was known heretofore that ethylene polymers, upon prolonged exposure to sunlight, underwent oxidation and photo-degradation reactions which resulted in chemical modifications of the polymeric molecule with a corresponding loss of tensile strength and elongation. To protect such olefin polymers from this degradation, various substances have been added to the polymers during their processing, but as is frequently the case, these added substances tend to have an undesirable effect on the other properties of the polymer. For example, many of these substances tend to impair the electrical properties of the polymer and produce undesirable color effects.

This invention has as an object the provision of new and useful compositions of matter comprising certain normally solid olefin polymers. A further object of this invention is to provide compositions comprising certain normally solid olefin polymers and, particularly, polyethylene compositions which have improved physical stability. Another object is to provide compositions comprising certain normally solid olefin polymers which, in the form of free films, molded articles, fibers, coatings, etc., are stabilized against degradation due to outdoor exposure.

The compounds which are especially effective in combination with the normally solid olefin polymers according to the present invention are 2-benzothiazolesulfenamides in which one valence of the amide nitrogen is satisfied by one of the following groups: cyclohexyl benzyl, lower-alkyl substituted cyclohexyl, lower-alkyl substituted benzyl, and branched chain alkyl radicals having up to eight carbon atoms. The other amide nitrogen valence is satisfied by a hydrogen atom or a lower alkyl radical.

Suitable examples of the above radicals are: lower-alkyl substituted cyclohexyl, e.g. 2-methyl-cyclohexyl, 2,6-dimethylcyclohexyl, 2,4-dimethylcyclohexyl, 4 - ethylcyclohexyl, 4 - butylcyclohexyl, etc.; lower alkyl substituted benzyl, e.g. 2,6-dimethylbenzyl, 2,6-diethylbenzyl, 4-isopropylbenzyl, 4-isobutylbenzyl, etc.; branched chain alkyl radicals having up to eight carbon atoms, e.g. isopropyl, sec-butyl, t-butyl, 1-methyl butyl, 1,1-dimethyl butyl, 1-methyl-3-methyl-butyl, 1,1-dimethylamyl, 1 - ethyl-amyl, 1,1-dimethylheptyl, t-octyl etc.; and lower alkyl radicals, e.g. methyl, ethyl, isopropyl, n-propyl, n-butyl, sec.-butyl.

Divalent radicals forming with the amide nitrogen a closed six membered heterocyclic ring are also contemplated, as for example: piperidyl, 2-methylpiperidyl, 3-methylpiperidyl, 4-methylpiperidyl, 2,6-dimethylpiperidyl, 4-ethylpiperidyl, 4-butylpiperidyl, morpholinyl, 2-methyl morpholinyl, 2,6-dimethylmorpholinyl, 3-butylmorpholinyl, pyridyl, 2-methylpyridyl, 3-methylpyridyl, 4-methylpyridyl, 4-butylpyridyl, 2,6-dimethylpyridyl.

The above-described 2-benzothiazolesulfenamides may be prepared by methods well known to those skilled in the art. For example, the N-cyclohexyl- and N-benzyl derivatives may be prepared by the reaction of sodium mercaptobenzothiazole with cyclohexylamine and benzylamine respectively in an acidic oxidation media, according to the methods described in the patent to Harman, U.S. 2,191,656. The branch chain alkyl derivatives may be prepared by oxidizing, in aqueous media, a mixture of sodium mercapto benzothiazole and a branched chain alkyl amine, according to the method described in the patent to Cooper et al. U.S. 2,807,620.

The quantity of 2-benzothiazolesulfenamide compound which is employed in the practice of the invention is generally within the range of from about 0.05% to about 1% by weight of said compound, based on the total weight of the normally solid olefin polymer and said compound. Excellent results are obtained when the content of 2-benzothiazolesulfenamide is in the range of from about 0.05% to about 0.5% by weight of the composition.

The expression "normally solid olefin polymer" as used herein in the specification and claims shall be understood to refer to any normally solid aliphatic hydrocarbon polymer of short chain mono-olefins, e.g. polymers of ethylene, propylene, isobutylene, etc. regardless of the process by which it is produced. For example, the commercial polyethylene currently produced by high-pressure processes can be used as well as the high-density ethylene polymers obtained by the newer low-pressure processes, such as the proprietary materials, "Marlex," "Marlex 50," etc., produced by the so-called Ziegler polymers produced by the Ziegler process and other low-pressure processes wherein the so-called Ziegler catalysts are used.

The normally solid olefin polymers used in the compositions of this invention may be copolymers of two or more of the aforementioned normally solid olefin polymers, especially copolymers of ethylene with minor amounts (from 2 to 10 percent) of higher olefins such as propylene or butylene, and copolymers of one or more short chain mono-olefinic aliphatic hydrocarbon monomers with minor proportions, not to exceed 15% by weight of the olefin, of other ethylenically-unsaturated comonomers such as styrene, vinyl chloride, vinyl acetate, vinyl methyl ether, vinylidene chlorofluoride, methyl methacrylate.

The olefin polymers to which the present invention is applicable must have molecular weights sufficiently high to be normally solid at room temperatures, i.e., above about 5000; preferably, the olefin polymers will have even higher molecular weights, e.g., 20,000 and above. The molecular weights in question are those calculated in the conventional manner on the basis of the viscosity of the polymer in solution, as described in J.A.C.S. 73, page 1901 (1951).

The novel compositions of this invention can be prepared in any suitable manner which will effect thorough and intimate mixing of the polymer and the 2-benzothiazolesulfenamide. This can be accomplished in any machine suitable for mixing solids, as by milling a mixture of the two on hot or cold mill rolls as the nature of the polymer permits, by mixing in Banbury mixers or other well known devices of this nature, or it may be mixed with the polymer in the form of molding powder and incorporated during extrusion or during injection molding. Instead of adding the 2-benzothiazolesulfenamide to the polymer in the solid or molten state, it can be added to a solution or suspension of the polymer in an organic solvent, e.g. ethanol, benzene, toluene, xylene, etc., as the particular mixing procedure warrants, which solution may then be employed for the formation of films, for wet or dry spinning of fibers, monofilaments, and the like. The 2-benzothiazolesulfenamide may be added as such or may first be dissolved in a suitable solvent as the particular mixing procedure warrants.

Although the compositions of this invention are composed essentially of normally solid olefin polymers and 2-benzothiazolesulfenamide compounds, small amounts of other materials can also be added. These materials include, for example, fillers, compatible resins, plasticizers, pigments, dyes, lubricants, antistatic agents, other stabilizers, etc. which can be added to modify the compositions for a particular application. The 2-benzothiazolesulfenamide can be incorporated in the polymer composition before, during or after the incorporation of such other materials therein.

The following examples, in which all parts are by weight unless otherwise specified, more fully illustrate the nature of the invention; however, the specific details of these examples are not to be taken as limitations upon the invention:

EXAMPLE I

*Preparation of Thin Film*

Pellets of DYNH polyethylene (which material has an average molecular weight of about 21,000 and is manufactured by the Bakelite Division of Carbide and Carbon Chemical Company) are mixed with xylene to provide a solution containing 20% polyethylene. The solution is then heated to 130° C. with agitation until complete solution is effected. This solution is then divided into two portions. Into one portion is dissolved an amount of N-cyclohexyl-2-benzothiazolesulfenamide, such that the final solution contains 0.5% by weight of said compound based on the total weight of the sulfenamide and the polyethylene. The second portion of the above-described solution constitutes the control. Each solution is allowed to stand in an oven at 130° C. until all air bubbles disappear, at which time they are each cast over a glass plate, previously heated to 130° C., to form in each case a film approximately 20 mils thick. The film in each case is then air dried at 130° C. and cooled to room temperature. The dried films (approximately 4 mils thick) are then removed from the glass plate and tested as indicated in Example II below.

EXAMPLE II

*The Effect of Outdoor Weathering*

Film samples prepared as in Example I are simultaneously exposed to St. Louis County, Missouri, summer and fall weather for a period of 210 days. At the end of 100, 150 and 210 day periods, small specimens are cut from each film and tested for maximum elongation. The results of these tests with the films, i.e. the modified film and the unmodified or control film, of Example I are set forth in Table A.

TABLE A

| Film of Example I | Maximum Elongation (percent) | | | |
|---|---|---|---|---|
| | Initial | 100 days | 150 days | 210 days |
| 1. Control | 650 | 120 | 40 | 30 |
| 2. Containing 0.5% by wt. of N-cyclohexyl-s-benzothiazolesulfenamide | 690 | 470 | 420 | 300 |

The foregoing results indicate qualitatively the stabilizing effect of the N-cyclohexyl-2-benzothiazolesulfenamide.

EXAMPLE III

Examples I and II are repeated except that the proportion of N-cyclohexyl-2-benzothiazolesulfenamide is varied so as to produce polymer compositions containing 0.05%, 0.075%, 0.1%, 0.75% and 1.0%, by weight of the sulfenamide compound. Similar results are obtained in that the film containing the lower percentage of the sulfenamide essentially exhibits the same elongation properties as the stabilized film of Example II, whereas the films containing the higher percentages of the stabilizer exhibit slightly lower elongation properties. Slight indications of incompatibility are observed at the 0.75% and 1.0% concentration levels.

EXAMPLE IV

Example II is repeated but using, in place of the N-cyclohexyl-2-benzothiazolesulfenamide, the following 2-benzothiazolesulfenamides:

(1) N-benzyl-benzothiazolesulfenamide
(2) N-2,6-dimethylbenzylbenzothiazolesulfenamide
(3) N-2-methylbenzylthiazolesulfenamide
(4) N-2,6-dimethylcyclohexylbenzothiazolesulfenamide
(5) N-t-butylbenzothiazolesulfenamide
(6) N-t-octylbenzothiazolesulfenamide
(7) N-isopropyl-N-methylbenzothiazolesulfenamide
(8) N-isobutyl-N-ethylbenzothiazolesulfenamide
(9) N-piperidylbenzothiazolesulfenamide
(10) N-morpholinylbenzothiazolesulfenamide
(11) N-pyridylbenzothiazolesulfenamide
(12) N-2,6-dimethylpiperidylbenzothiazolesulfenamide
(13) N-2,6-dimethylpyridylbenzothiazolesulfenamide
(14) N-benzyl-N-methylbenzothiazolesulfenamide
(15) N-cyclohexyl-N-methylbenzothiazolesulfenamide
(16) N-t-butyl-N-methylbenzothiazolesulfenamide
(17) N-2,4,6-triethylbenzylbenzothiazolesulfenamide
(18) N-4-methylpiperidylbenzothiazolesulfenamide In each case the 2-benzothiazolesulfenamide exerts a definite stabilizing effect on the polyethylene composition.

While this invention has been described with respect to certain embodiments, it is not so limited, and it is to be understood that variations and modifications thereof can be made without departing from the spirit or scope of the invention.

What is claimed is:

1. A composition of matter comprising a normally solid polymer selected from the group consisting of normally solid polymers of straight chain mono-olefinic hydrocarbon monomers having from two to four carbon atoms and normally solid copolymers of straight chain mono-olefinic hydrocarbon monomers having from two to four carbon atoms with a minor proportion not to exceed 15% by weight of the olefin of a mono-ethylenically unsaturated comonomer and a stabilizing amount of a 2-benzothiazolesulfenamide selected from the group consisting of (1) 2-benzothiazolesulfenamides in which one amide nitrogen valence is satisfied by a radical selected from the group consisting of hydrogen and lower alkyl radicals, and the other nitrogen valence is satisfied by a radical selected from the group consisting of cyclohexyl, lower alkyl substituted cyclohexyl, benzyl, lower alkyl substituted benzyl, and branch chain alkyl radicals having up to eight carbon atoms; (2) 2-benzothiazolesulfenamides in which divalent radicals form with the amide nitrogen a six-membered heterocyclic ring selected from the group consisting of piperidyl, pyridyl and morpholinyl, and (3) 2-benzothiazolesulfenamides in which divalent radicals form a six-membered heterocyclic ring selected from the group consisting of piperidyl, pyridyl and morpholinyl, which heterocyclic ring is further substituted by at least one lower alkyl radical.

2. A composition of matter comprising a normally solid homopolymer of ethylene and a 2-benzothiazolesulfenamide in which one amide nitrogen valence is satisfied by a hydrogen atom and the other amide nitrogen valence is satisfied by a cyclohexyl radical of the structure:

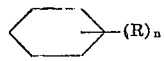

wherein R is a lower alkyl radical and $n$ is an integer of from 0 to 3, said 2-benzothiazolesulfenamide being present in a stabilizing amount, in the range of from 0.05% to 0.5% by weight, based on the total weight of the polymer and the 2-benzothiazolesulfenamide.

3. The composition of claim 2 wherein the ethylene polymer is a homopolymer of ethylene having a molecular weight of at least 20,000.

4. The composition of claim 2 wherein the 2-benzothiazolesulfenamide is N - cyclohexyl-2-benzothiazolesulfenamide.

5. A composition of matter comprising a normally solid polymer of ethylene and a minor amount of a 2-benzothiazolesulfenamide in which one amide nitrogen valence is satisfied by a hydrogen atom and the other amide nitrogen valence is satisfied by a benzyl radical of the structure:

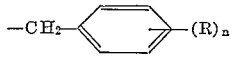

wherein R is a lower alkyl radical and *n* is an integer of from 0 to 3.

6. The composition of claim 5 wherein the ethylene polymer is a homopolymer of ethylene having a molecular weight of at least 20,000.

7. The method of protecting a normally solid polymer selected from the group consisting of normally solid polymers of straight chain mono-olefinic hydrocarbon monomers having from two to four carbon atoms and normally solid copolymers of straight chain mono-olefinic hydrocarbon monomers having from two to four carbon atoms with a minor proportion not to exceed 15% by weight of the olefin of a mono-ethylenically unsaturated comonomer against the adverse effects of weather comprising incorporating therein from about 0.05% to about 1% by weight of a 2-benzothiazolesulfenamide selected from the group consisting of (1) 2-benzothiazolesulfenamides in which one amide nitrogen valence is satisfied by a radical selected from the group consisting of hydrogen and lower alkyl radicals, and the other nitrogen valence is satisfied by a radical selected from the group consisting of cyclohexyl, lower alkyl substituted cyclohexyl, benzyl, lower alkyl substituted benzyl, and branch chain alkyl radicals having up to eight carbon atoms; (2) 2-benzothiazolesulfenamides in which divalent radicals form with the amide nitrogen a six-membered heterocyclic ring selected from the group consisting of piperidyl, pyridyl and morpholinyl; and (3) 2-benzothiazolesulfenamide in which divalent radicals form a six-membered heterocyclic ring selected from the group consisting of piperidyl, pyridyl and morpholinyl, which heterocyclic ring is further substituted by at least one lower alkyl radical, said weight being based on the total weight of said polymer and the 2-benzothiazolesulfenamide.

8. The method of protecting a normally solid homopolymer of ethylene against the adverse effects of weather which comprises incorporating therein from about 0.05% to about 0.5% by weight of 2-benzothiazolesulfenamide in which one amide nitrogen valence is satisfied by a hydrogen atom and the other amide nitrogen valence is satisfied by a cyclohexyl radical of the structure

wherein R is a lower alkyl radical and *n* is an integer of from 0 to 3, said weight being based on the total weight of said polymer and the 2-benzothiazolesulfenamide.

9. The method of claim 8 wherein the ethylene polymer is a homopolymer of ethylene having a molecular weight of at least 20,000.

10. The method of claim 8 wherein the 2-benzothiazolesulfenamide is N-cyclohexyl-2-benzothiazolesulfenamide.

11. The method of protecting a normally solid polymer of ethylene against the adverse effects of weather which comprises incorporating therein from about 0.05% to about 0.5% by weight of 2-benzothiazolesulfenamide in which one amide nitrogen valence is satisfied by a hydrogen atom and the other amide nitrogen valence is satisfied by a benzyl radical of the structure

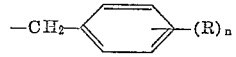

wherein R is a lower alkyl radical and *n* is an integer of from 0 to 3, said weight being based on the total weight of said polymer and the 2-benzothiazolesulfenamide.

12. The method of claim 9 wherein the ethylene polymer is a homopolymer of ethylene having a molecular weight of at least 20,000.

References Cited in the file of this patent

UNITED STATES PATENTS

| | | |
|---|---|---|
| 2,191,657 | Harmon | Feb. 27, 1940 |
| 2,448,799 | Happoldt et al. | Sept. 7, 1948 |
| 2,582,510 | Stiratelli | Jan. 15, 1952 |
| 2,619,481 | Baldwin et al. | Nov. 25, 1952 |